United States Patent
Olmstead

(10) Patent No.: US 8,091,788 B2
(45) Date of Patent: Jan. 10, 2012

(54) METHODS AND SYSTEMS FOR OPTICAL CODE READING USING VIRTUAL SCAN LINES

(75) Inventor: Bryan L. Olmstead, Eugene, OR (US)

(73) Assignee: Datalogic Scanning, Inc., Eugene, OR (US)

( * ) Notice: Subject to any disclaimer, the term of this patent is extended or adjusted under 35 U.S.C. 154(b) by 808 days.

(21) Appl. No.: 11/972,538

(22) Filed: Jan. 10, 2008

(65) Prior Publication Data

US 2008/0169347 A1 Jul. 17, 2008

Related U.S. Application Data

(60) Provisional application No. 60/880,254, filed on Jan. 11, 2007.

(51) Int. Cl.
*G06K 7/10* (2006.01)

(52) U.S. Cl. .............................. 235/462.41; 235/462.09

(58) Field of Classification Search ............. 235/462.41, 235/462.09–11, 462.24–25
See application file for complete search history.

(56) References Cited

U.S. PATENT DOCUMENTS

| | | | |
|---|---|---|---|
| 5,635,699 A | 6/1997 | Cherry et al. | |
| 6,042,012 A | 3/2000 | Olmstead et al. | |
| 6,142,376 A | 11/2000 | Cherry et al. | |
| 6,267,296 B1 * | 7/2001 | Ooshima et al. | 235/487 |
| 6,412,695 B1 * | 7/2002 | Reber et al. | 235/462.07 |
| 6,431,452 B2 * | 8/2002 | Feng | 235/472.01 |
| 7,215,493 B2 | 5/2007 | Olmstead et al. | |
| 2006/0081712 A1 | 4/2006 | Rudeen et al. | |
| 2006/0164541 A1 | 7/2006 | Olmstead et al. | |
| 2006/0208083 A1 | 9/2006 | Kotlarsky | |
| 2006/0278708 A1 | 12/2006 | Olmstead | |
| 2006/0278713 A1 | 12/2006 | Olmstead et al. | |
| 2007/0057066 A1 | 3/2007 | Cai et al. | |
| 2007/0215708 A1 | 9/2007 | Actis | |
| 2009/0003722 A1 * | 1/2009 | Nadabar et al. | 382/255 |

OTHER PUBLICATIONS

PCT Written Opinion in PCT/US08/50802 dated Jun. 27, 2008.

* cited by examiner

*Primary Examiner* — Daniel St. Cyr
(74) *Attorney, Agent, or Firm* — Stoel Rives LLP

(57) ABSTRACT

Methods and systems are disclosed for processing of 2-D images of optical code symbols having information bearing characteristics in predominantly a single dimension (such as a linear barcode). In a preferred system, pixel summing or averaging is used to generate virtual scan lines for imaging of encoded symbols to improve the signal to noise ratio (SNR) of the resulting virtual scan lines. For example, pixel summing or averaging of an imaging array may be performed in a direction orthogonal to the virtual scan line direction in order to increase the SNR of the virtual scan line signal over what can be achieved with virtual scan lines created using a single image pixel for each virtual scan line pixel. The increased SNR offered by this technique of pixel summing or averaging of an imaging array may allow capture of images with reduced exposure time, enabling capture of images of objects moving at high speed without the necessity of high intensity light sources.

8 Claims, 7 Drawing Sheets

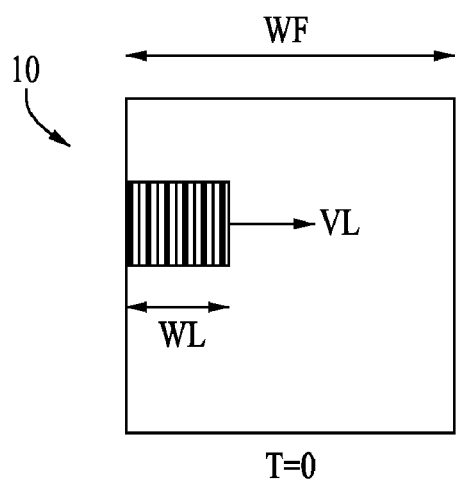
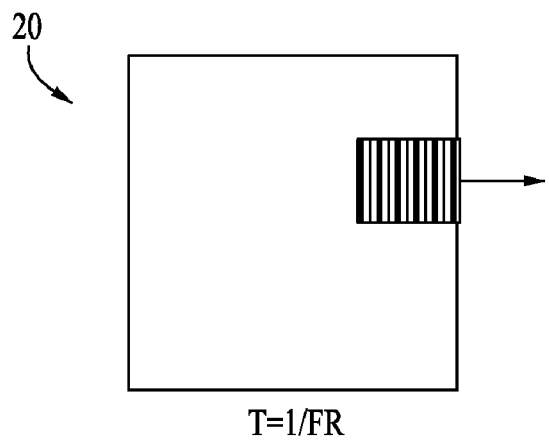
fig.1
fig.2
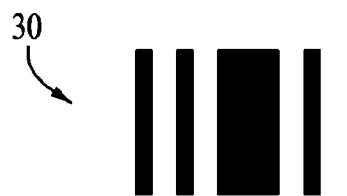
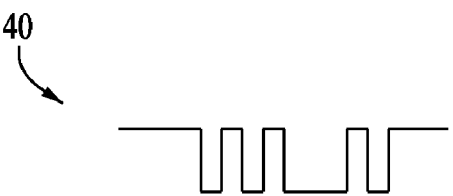
fig.3
fig.4
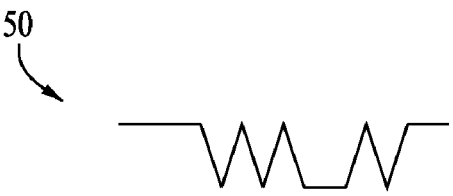
fig.5

1 PIXEL PER VIRTUAL SCAN LINE COORDINATE

7 PIXELS PER VIRTUAL SCAN LINE COORDINATE

HORIZONTAL

VERTICAL

DIAGONAL

METHODS AND SYSTEMS FOR OPTICAL CODE READING USING VIRTUAL SCAN LINES

RELATED APPLICATION DATA

This application claims priority to provisional application No. 60/880,254 filed Jan. 11, 2007 hereby incorporated by reference.

COPYRIGHT NOTICE

© 2008 Datalogic Scanning, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

BACKGROUND

The field of the present disclosure relates to optical readers and more particularly, to methods and systems for using and generating virtual scan lines for imaging of encoded symbols.

Optical reading of data or encoded symbols, such as barcode labels, has been used for some time in many applications. Typically, a barcode consists of a series of parallel light and dark rectangle areas of varying widths. Different widths of bars and spaces define different characters in a particular barcode symbology. A barcode label may be read by a scanner which detects reflected and/or refracted light from the bars and spaces comprising the characters. One common method of reading the barcode label is by scanning a beam of light (e.g. a laser beam) across the barcode label and detecting the reflected light via an optical detector. The detector generates an electrical signal having an amplitude determined by the intensity of the collected light.

Scanning laser barcode reading systems may either have a single scan line directed toward the target, as in the case of typical handheld barcode readers, or may have a pattern of laser scan lines, which is typically the case for fixed mounted barcode readers. Another method of reading a barcode label involves illuminating the barcode label with a light source and detecting the reflected light through an imaging lens onto an array of optical detectors connected to an analog shift register, such as a charge coupled device (CCD) or CMOS sensor. This detector may be a one dimensional line of pixels (a so-called linear imager) or a two dimensional array of pixels (a so-called area sensor). An electrical signal is generated having an amplitude determined by the intensity of the collected light. As the image is read out, positive and negative transitions in the electrical signal occur signifying transitions between the bars and spaces.

The scan patterns of fixed mounted barcode readers impose limitations on the ability to read highly truncated or damaged barcodes. These limitations are overcome by area imaging readers, as the redundant information contained in the full height of the bars and spaces can be used to discern the bar and space pattern versus a single strike through the barcode that occurs in a fixed mounted laser reader. However, imaging readers have disadvantages when used in high speed applications. There is a tradeoff of illumination intensity, depth of field, and image capture speed that limits the overall performance of such barcode readers, due to the signal to noise limits of the image sensor. Improvement of depth of field in high speed imaging readers is typically accomplished by increasing the illumination intensity, as the other factors, such as imager noise and lens aperture have more significant side effects in their optimization.

The present inventors have recognized a need for improved systems and methods for reading optical codes using a high speed imaging system.

SUMMARY

The present disclosure is directed to systems and methods for reading optical code symbols. In preferred applications, the systems and methods are particularly useful for reading optical code symbols having information bearing characteristics primarily in a single dimension, such as linear barcodes. In one preferred system, pixel summing is used to generate virtual scan lines for high speed imaging of encoded symbols. For example, pixel summing or averaging of an imaging array may be performed in a direction orthogonal to the virtual scan line direction in order to increase the signal to noise ratio (SNR) of the virtual scan line signal over what would be possible when using virtual scan lines that are only one pixel wide. The increased SNR offered by this technique of pixel summing or averaging of an imaging array may allow capture of images with reduced exposure time, enabling capture of images of objects moving at high speed without the necessity of high intensity light sources. The SNR improvement is achieved since uncorrelated noise adds in a root mean squared fashion while the signal adds in a linear fashion. SNR is thus improved by a factor proportional to the square root of the number of pixels summed or averaged.

Another preferred embodiment is directed to a method of reading an encoded symbol including the steps of: 1) illuminating a symbol; 2) capturing an image onto a 2-D imaging array; 3) creating virtual scan lines of arbitrary position and angle using the captured image, wherein the scan lines are composed of a convolution of the image pixels and a 2-D filter kernel along a virtual scan line trajectory; 4) detecting edges in the virtual scan lines; and 5) processing the edges found in the virtual scan lines using a decoding algorithm.

These and other aspects of the disclosure will become apparent from the following description, the description being used to illustrate certain preferred embodiments when read in conjunction with the accompanying drawings.

BRIEF DESCRIPTION OF THE DRAWINGS

FIG. 1 illustrates a frame rate requirement for high speed imaging of a label on the left side of the field of view.

FIG. 2 illustrates a frame rate requirement for high speed imaging of a label on the right side of the field of view.

FIG. 3 illustrates a typical barcode that may be read according to a preferred embodiment.

FIG. 4 illustrates an imaged waveform of the barcode of FIG. 3 with no motion.

FIG. 5 illustrates an imaged waveform of the barcode of FIG. 3 with motion.

DETAILED DESCRIPTION OF THE PREFERRED EMBODIMENTS

Figure 6:
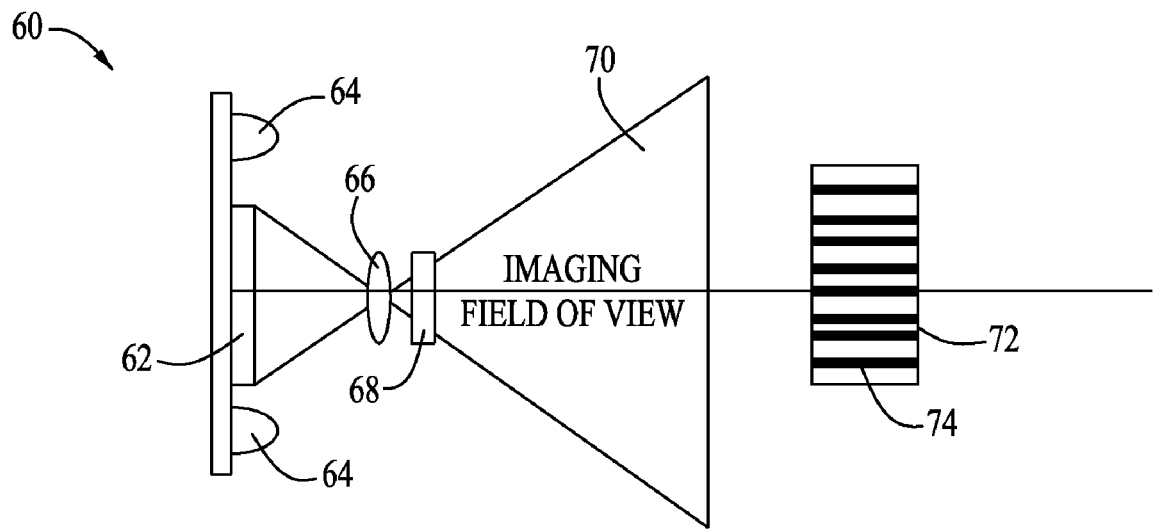
FIG. 6 illustrates a side view of an imaging system according to a preferred embodiment.

Preferred embodiment will now be described with reference to the drawings. While preferred embodiments are described below with reference to generating virtual scan lines using pixel summing, a practitioner in the art will recognize the principles described herein are viable to other applications.

FIG. 1 illustrates a first frame 10 for an image of a barcode label captured on the left side of the field of view. FIG. 2 illustrates a second frame 20 of the label now imaged on the right side of the field of view, due to label motion during the elapsed time from the capture of the first frame to the second frame. Two conditions are preferably met in order for an imaging system to capture an acceptable image in the presence of large object motion. The first condition is that the frame rate should be high enough to avoid the object passing through the field of view of the imaging system between the frames. The second condition is that the exposure time of the imaging system should be quick enough to avoid blurring the small features of the image. To ensure capture of at least one image of a full label by an imaging system of a label moving left to right at velocity VL, the conditions illustrated in FIGS. 1 and 2 apply. If an image is captured of a moving label by an imaging system whereby the image of the label abuts the left edge of the image, as shown in FIG. 1, the frame rate of the imaging system must be fast enough to ensure that the location of the label captured in the next frame is no further to the right than abutting the right edge of the image, as shown in FIG. 2. This condition ensures that a full label image will be captured regardless of synchronization of the frame rate with the label motion. The equation for the minimum frame rate is:

$$FR\text{min}=VL/(WF-WL) \quad (1)$$

where VL is the velocity of the label, WF is the width of the field and WL is the width of the label. For example, if WF=3.5 inches, WL=1.25 inches and VL=20 inches/sec then the minimum frame rate speed (FRmin)=8.9 frames/sec.

FIGS. 3, 4 and 5 illustrate the exposure time requirement for reading optical codes such as barcodes. FIG. 3 illustrates a few bars of varying widths to represent a typical barcode 30. FIG. 4 illustrates a linear profile waveform 40 across an image of a barcode 30 with no label motion during the exposure time. FIG. 5 illustrates a linear profile waveform 50 across an image of a barcode 30 that was moving left to right at a velocity such that during the exposure time of the image, the label has moved to the right by the width of the smallest element of the barcode label. The equation for the exposure time to create this condition is:

$$T\text{exp}=X/V \quad (2)$$

where X is the minimum element width in the barcode label and V is the label velocity. This condition sets the maximum exposure time that does not reduce contrast (also known as modulation depth) of an otherwise unblurred image of a barcode label. Thus the exposure time sets a limit on useful label velocity, in addition to the frame rate limitation. It is noted that an exposure time of twice this value causes small elements in the barcode to be imaged with zero contrast. So exposure time sets a sharp limit on label velocity. For example, reading fence oriented barcodes (barcodes aligned like fence pickets, such as in FIG. 3) with the label motion from left to right requires the correct exposure time for the image to be captured without excessive motion blur. To read 13 mil barcodes at 20 inches/sec requires an exposure time of no more that 650 µs.

Interline Transfer CCDs and Frame Shuttered Complimentary Metal Oxide Semiconductor (CMOS) imagers are capable of exposing all pixels in the image at the same time. Row Reset CMOS imagers expose all pixels in a single row at the same time, but expose each row staggered in time. Providing an efficient source of illumination to capture an image with a short exposure time is straightforward with Interline Transfer CCDs and Frame Shuttered CMOS imagers as the exposure time of all pixels occurs simultaneously. Illumination of the target need be performed only during this short exposure interval in a strobing fashion, being very power efficient. In contrast, operation of Row Reset CMOS imagers require constant illumination during the entire frame time to use the rolling reset exposure control. This requirement is because the exposure of each pixel row happens at a different time, thus requiring significantly more light than the frame shuttered case. Alternately, the imager may be set up to expose each row for an entire frame for full frame exposure, wherein a mechanical shutter may be used to control the exposure, yielding the advantages of a frame shuttered imager, albeit with the need for mechanical parts or some other mechanism.

FIG. 6 illustrates an alternate method of using a Row Reset CMOS imaging device 60 without use of a mechanical shutter. The imaging device 60 includes a row reset CMOS (RRCMOS) imager 62 surrounded by one or more near-infrared (near-IR) light emitting diodes (LEDs) 64, an imaging lens 66 and a near-IR bandpass filter 68 collecting reflected light in an imaging field of view 70. The near-IR bandpass filter 68 blocks all visible wavelengths of light, preventing the RRCMOS imager 62 from gathering ambient light in the steady state condition. The near-IR LEDs 64 are pulsed for the duration of the exposure at a rate of once per frame. The reflected light passes through the near-IR bandpass filter 68 exposing the RRCMOS imager 62. The imager is configured to expose each pixel row for a full frame ensuring that each pixel row receives light from the near-IR LED 64 pulses. For example, a near-IR wavelength of 740 nm or 850 nm is advantageous because it is invisible to the human eye. This choice of wavelength removes the constraint of having LEDs pulse at 50 Hz or more, avoiding the flicker effect that is distracting to the user of an imaging device 60. Furthermore, fluorescent ambient light sources have very little energy in the near-IR spectrum, allowing filter 68 to effectively attenuate ambient light sources.

A variety of inks provide good contrast at these infrared wavelengths. Alternately, visible LED illumination may be used in imaging device 60, especially when used to read barcode labels that have low infrared contrast. However, visible light wavelengths are preferably pulsed at 50 Hz or more to avoid the flicker effect and a mechanical frame shutter incorporated when using a RRCMOS imager 62. The shutter, in this case, would be open during the pulsing of the illumination LEDs and closed for the remainder of the frame period. Of course, no mechanical shutter or optical filter 68 is required when using a frame shuttered imager, as it electronically exposes the pixels only during the LED pulse duration. In order to reduce the parts count, the LEDs may be pulsed at a current level exceeding their maximum direct current (DC) level, which may be about 10-50 times greater than their maximum DC limit, because the LED illumination is active for a short pulse once per frame. Therefore, fewer LEDs are required to achieve the desired illumination level. The virtual scan line generation using pixel summing as described in this disclosure may also apply to a system as disclosed in U.S. Published Application No. US2006/0164541, that is hereby incorporated by reference.

An image of label 72 onto imager 62 may be processed by generating a sequence of pixel intensities along a particular linear trajectory across the imager, termed virtual scan lines. The pixel sequence signal generated by a virtual scan line is ideally the same through any cross-section of the encoded symbol 72 that receives the reflected light perpendicular to the bars 74, that is, the light and dark areas of the symbol. To enable an increased sweep speed for imaging device 60, reduction of the exposure time of the captured image is desired, according to equation (2) above. The signal to noise ratio of an image captured with a reduced exposure time will be lower, as the noise sources due to the imager 62 may be unchanged while the collected signal amplitude is lower. To increase the signal to noise ratio of the virtual scan lines that are used to process the image, the virtual scan lines may be generated using pixel averaging or pixel summing. While a virtual scan line may be generated from the image data using one pixel of image data per coordinate along the virtual scan line axis, improved signal to noise may be achieved by using a plurality of N pixels in a direction that is perpendicular to the imaging axis. The plurality of the N pixels may be averaged, (i.e. a process of pixel averaging whereby the values of the N pixels are added and sum is divided by N). The step of dividing by N in the averaging process may be skipped, as this pixel averaging process just scales the data and may be unnecessary for any processing that is tolerant of amplitude scaling, as is common in the processing of barcode images. The result of skipping the division step is then pixel summing rather than pixel averaging.

Depending on the application, pixel summing may be just as effective as pixel averaging, but with lower computational burden, as the division step is skipped. Assuming a virtual scan line signal is created by summing (rather than averaging), the resulting virtual scan line signal is thus N times larger than a one pixel wide virtual scan line. The uncorrelated Gaussian random noise is increased in variance by the number of samples taken, so that the standard deviation of noise is increased by the square root of the number of samples or $\sqrt{N}$. Since the signal is N times larger, the signal to noise ratio is improved by a factor of $\sqrt{N}$. The noise sources in imager 62 are a fixed pattern offset noise, a fixed pattern gain noise and thermal noise which are mostly uncorrelated Gaussian random noise sources. So in a practical fashion, generating virtual scan lines by summing N image pixels per virtual scan line pixels in an orientation orthogonal to the virtual scan line direction serves to improve the SNR of the virtual scan line signal by a factor of $\sqrt{N}$ over that of a virtual scan line composed of a single image pixel per virtual scan line pixel. This method allows the exposure time for the image to be $\sqrt{N}$ times smaller than without using this technique, which enables an increased sweep speed of barcode label 72 across the field of view 70.

Figure 16:
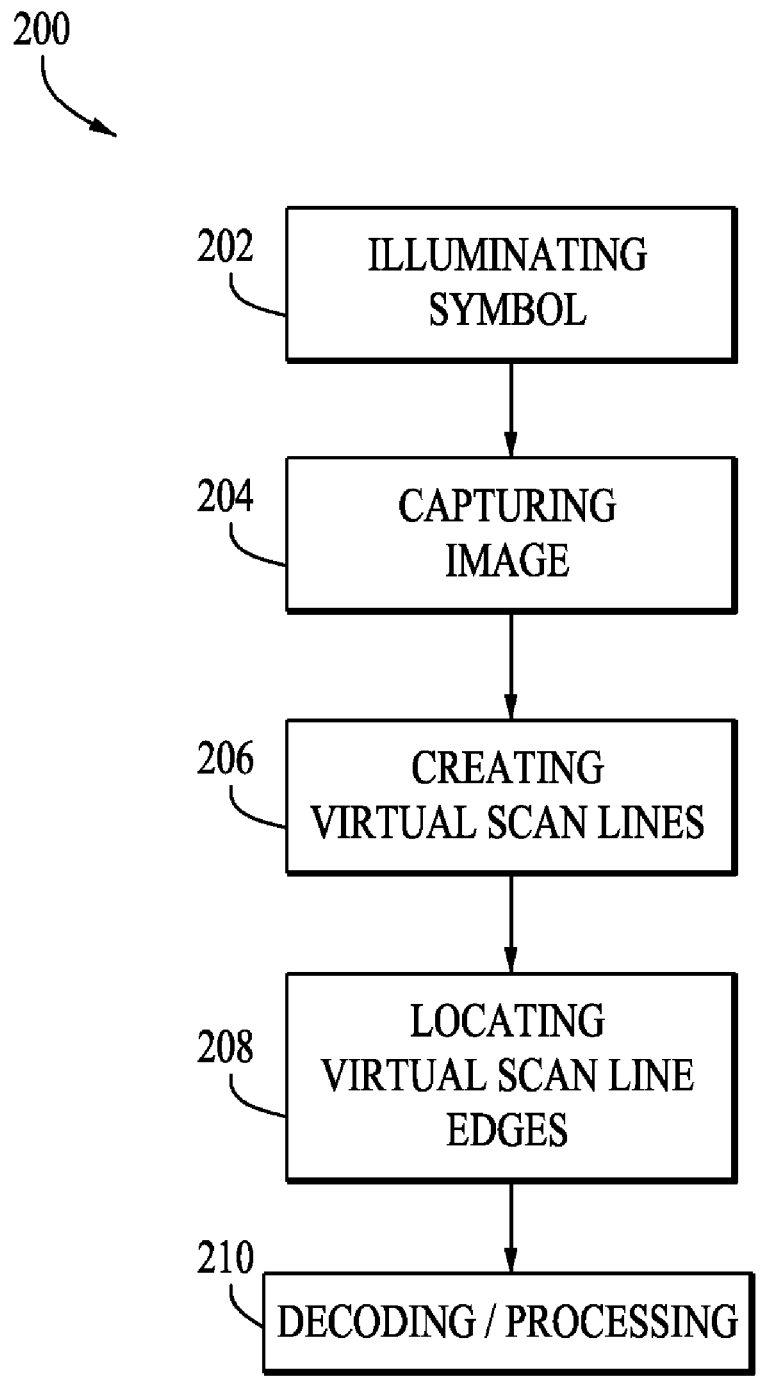
FIG. 16 illustrates a block diagram showing virtual scan line generation using pixel summing in a preferred embodiment.

FIG. 16 is a flow chart of a virtual scan line generation method 200 using pixel summing. A preferred method includes the step 202 of illuminating a symbol, capturing (at step 204) an image onto a 2-D imaging array with light reflected from the symbol; creating (at step 206) virtual scan lines of arbitrary position and angle using the captured image wherein the scan lines are composed of the convolution of the image pixels and a 2-D filter kernel along a virtual scan line trajectory; finding (at step 208) edges in the virtual scan lines; and processing (at step 210) the edges found in the virtual scan line using a decoding algorithm. The step of illuminating the symbol (step 202) may be accomplished via illumination with a light source or via ambient light.

As part of the method 200, a software algorithm may be used to generate virtual scan line trajectories using the Bresenham line drawing algorithm. The software algorithm generates a 2-D filter kernel (as described in more detail below) that integrates (either by summing or averaging) additional image pixels in the neighborhood of the virtual scan line (e.g. orthogonal to the orientation of the virtual scan line) wherein: 1) the slope of the virtual scan line (angle with respect to the horizontal) indicates its orientation; 2) a kernel is generated containing 1's along a line 90° from the orientation of the scan line extending over a desired distance from the center of the kernel, corresponding to the amount of noise reduction desired, and containing 0's elsewhere; and 3) the kernel is preferably normalized to obtain a unity gain filter (in the case of pixel averaging).

Following is a sample code for implementing the Bresenham VSL pixel picking algorithm ©2008 Datalogic Scanning, Inc.

```
//////////////////////////////////////////////
// Store pixels from the current raster line into the proper VSLs.
//////////////////////////////////////////////
void VSL_pick_pixels (unsigned short row_num, unsigned char *row_buff)
{
int i;
vsl_state_t* p;
unsigned short value;
unsigned short src_offset, dst_offset;
int count;
    for (i = 0; i < CurrentNumVSLs; i++)
    {
        p = (vsl_state_t*)&(VSL_states[i]);
        while (p->enabled && row_num == p->next_vsl_pixel_y)
            // while the next VSL pixel is on this row ...
```

```
{
    // has a buffer been assigned to this VSL yet?
    if (!p->vsl_buf)        // allocate buffer as late as possible
    {
        p->vsl_buf = get_VSL_buffer( ); // get a pointer to a free VSL buffer
        if (p->vsl_buf)
        {
            p->vsl_buf->vsl_ID = i;
            p->vsl_buf->Frame_ID = FrameNum;
            p->vsl_buf->FilterSelection = VSL_Table[i].FilterSelection;
            p->vsl_buf->numPixels = 0;
        }
        else
            break;
    }
    if (p->dy == 0)         // horizontal line
    {
        memcpy(p->vsl_buf->pixels, &(row_buff[pixel_size * p->x1]),
            pixel_size*(p->dx+1)); // copy horizontal line
        // this line is ready to process, add buffer to queue
        p->vsl_buf->numPixels = p->total_pixels;
        VSL_BuffQueue[VSL_BuffQueueHead] = p->vsl_buf;
        p->vsl_buf = 0;
        VSL_BuffQueueHead++;
        VSL_BuffQueueEntries++;
        if (VSL_BuffQueueHead >= VSL_BUFF_QUEUE_LEN)
            VSL_BuffQueueHead = 0;
        break;
    }
    else // vertical or slanted line - use Breshenham's algorithm
    {
        dst_offset = p->vsl_buf->numPixels; // not using packed data
        src_offset = p->next_vsl_pixel_x; // not using packed data
        if (pixel_size == 1)
            value = row_buff[src_offset];
        else
            value = *((unsigned short*)(row_buff + (src_offset * pixel_size)));
                ((p->vsl_buf->pixels))[dst_offset * pixel_size] = value;
        p->vsl_buf->numPixels++;
        if (p->vsl_buf->numPixels == p->total_pixels)
        {
            // Add the VSL buffer pointer to the queue
            VSL_BuffQueue[VSL_BuffQueueHead] = p->vsl_buf;
            p->vsl_buf = 0;
            VSL_BuffQueueHead++;
            VSL_BuffQueueEntries++;
            if (VSL_BuffQueueHead >= VSL_BUFF_QUEUE_LEN)
                VSL_BuffQueueHead = 0;
            reset_vsl(p);
            break;
        }
        if (p->dx == 0) // vertical line
        {
            p->next_vsl_pixel_y++; // only need to update the next y value
            break;
        }
        else // slanted line - update Breshenham's algorithm values
        {
            if (p->dx >= p->dy) // Step along x axis (<= 45 degrees)
            {
                if (p->epsilon >= 0)
                {
                    p->next_vsl_pixel_y++;
                    p->epsilon -= p->dx;
                }
                p->epsilon += p->dy;
                p->next_vsl_pixel_x += p->x_inc;
            }
            else        // Step along y axis (>= 45 degrees).
            {
                if (p->epsilon >= 0)
                {
                    p->next_vsl_pixel_x += p->x_inc;
                    p->epsilon -= p->dy;
                }
                p->epsilon += p->dx;
                p->next_vsl_pixel_y++;
            }
        }   // slanted line
    }       // vertical or slanted line
```

```
        } // end while
        p++;
    }
} // end VSL_pick_pixels
```

Alternately, the kernel need not be normalized as data (at step (3) above) but may be normalized downstream (which is the case of pixel summing instead of pixel averaging). The nonzero values of the kernel need not be identical, but may vary in amplitude, such as a linear tapering of amplitude from the center of the kernel to the edge. This amplitude variation may provide reduced sensitivity to mismatch of label orientation with respect to virtual scan line orientation at the expense of noise reduction. A beneficial effect of the filtering process of either type of kernel may be that the kernel blurs the data in the non-scanning axis (that is the axis orthogonal to the virtual scan line orientation). As the image of the bars or spaces should be fairly uniform in this direction, the signal is preserved while the noise is reduced. The software algorithm then convolves the 2-D blurred kernel along the virtual scan line trajectory which results in a virtual scan line that follows the trajectory but is blurred (smoothed) in the non-scanning axis, resulting in a lower noise waveform than would result from generating a virtual scan line containing only a single image pixel per virtual scan line pixel.

If the filter kernel contains identical nonzero values, then no multiplication of filter kernel values with pixel intensity values is required, just summing of the pixel intensity values located at nonzero locations in the filter kernel and then dividing by the total number of pixels summed.

In the case of pixel summing, the convolution of such a kernel previously described involves merely summing selected image pixels to create the pixel result for a given virtual scan line pixel with no division required. In the case of pixel summing with a kernel that has identical nonzero values, the data for a virtual scan line pixel can be computed by summing image pixel data at pre-computed offsets from the current pixel location. For example, if the filter kernel has a value of 1 for the center pixel and the pixel to the left and right, then the virtual scan line pixel is computed by summing the image pixels at the current pixel location in memory and the previous and following memory location, so the pre-computed offsets for computing the virtual scan line pixel would be 0, −1, and +1.

Similar methods apply for pixels above or below the current pixel in the image. Assuming that the image is W pixels wide and one byte per pixel is stored in memory, then the pixel just below the current pixel is located in memory W bytes after the current pixel, while a pixel just above the current pixel is located in memory W bytes before the current pixel. So, for a filter kernel that implements summing of the current pixel and the pixels above and below it, the pre-computed offsets would be 0, −W, and +W. Microprocessors and DSP processors have a memory accessing mode, typically called indexed addressing mode, that is efficient for accessing memory from a base location (current image pixel) plus an offset. So efficient computation of pixel summed virtual scan lines is possible using pre-computed offsets and an indexed addressing mode. Furthermore, the filtering operation need only to be computed along virtual scan line trajectories instead of over the entire image, thus reducing the processing burden significantly.

Figure 7:
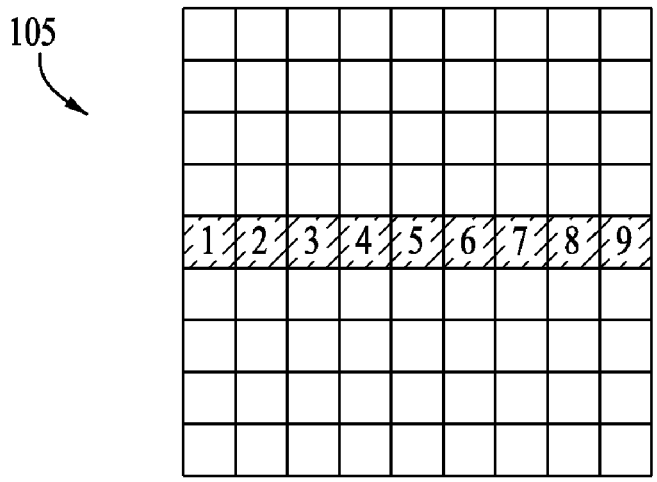
FIG. 7 illustrates generation of a virtual scan line using one image pixel per virtual scan line pixel.
Figure 8:
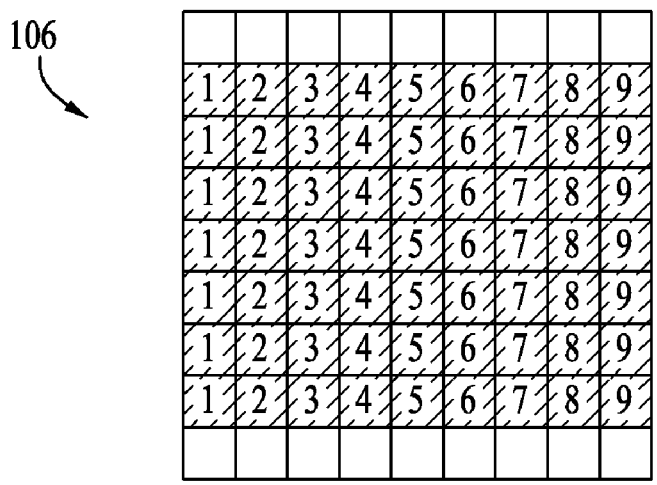
FIG. 8 illustrates pixel summing normal to the virtual scan line trajectory using 7 image pixels per virtual scan line pixel according to a preferred embodiment.

FIG. 7 illustrates the pixels that are chosen for a horizontal virtual scan line 105 comprised of one image pixel per virtual scan line pixel. The image pixels are numbered according to the virtual scan line pixel to which they correspond. FIG. 8 illustrates the pixels that are chosen for a horizontal virtual scan line 106 comprised of 7 image pixels per virtual scan line pixel. The 7 image pixels that are summed or averaged to form a virtual scan line pixel are numbered with the same value in the figure. The virtual scan line 106 is horizontal and the image pixels that are summed or averaged to generate a virtual scan line pixel are perpendicular, or vertical in this case.

Figure 9:
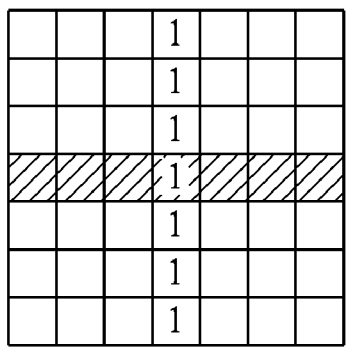
FIG. 9 illustrates a 2-D filter kernel to implement pixel summing for horizontal virtual scan lines in a preferred embodiment.
Figure 10:
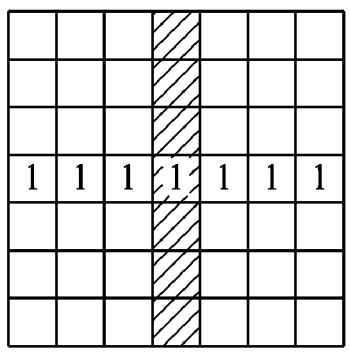
FIG. 10 illustrates a 2-D filter kernel to implement pixel summing for vertical virtual scan lines in a preferred embodiment.
Figure 11:
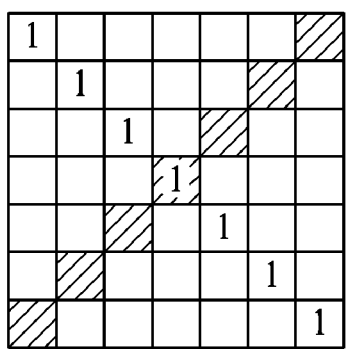
FIG. 11 illustrates a 2-D filter kernel to implement pixel summing for diagonal virtual scan lines in a preferred embodiment.

The process of pixel summing or averaging the pixels perpendicular to the virtual scan lines can be implemented as a 2-D filtering operation. That is, 2-D filters are described by filter kernels in a 2-D matrix of values convolved with an image. The filter kernel 107 that would be used to generate horizontal virtual scan lines whose pixels contain the sum of 7 image pixels in a perpendicular (vertical) direction as illustrated in FIG. 8 is shown in FIG. 9. The kernel includes 1's in a vertical orientation as shown, with the rest of the kernel matrix set to zero. The shaded portion of the filter kernel illustrates the direction of the virtual scan line that the kernel is intended for. FIGS. 10 and 11 illustrate 2-D filter kernels 108 and 109 that may create virtual scan line data for vertical and diagonal scan lines (slanting up and to the right) respectively. If pixel averaging were intended instead of pixel summing, the filter kernels in these cases would have the non-zero kernel elements set to 1/7. The filter kernel acts to weight the image pixels that are summed to form a virtual scan line pixel.

In the preferred embodiment of FIGS. 9-11, the kernels have equal weighting to the image pixels that are used in the summation. However, it may be desirable to create filter kernels that have tapered weighting, where the highest weighted image pixel is along the virtual scan line trajectory, and the image pixels farther from the center of the trajectory are weighted progressively less. For example, a linear tapering of kernel weight values on either side of the center may be appropriate. This tapered weighting may achieve a balance of noise reduction and reduced sensitivity to orientation differences between the virtual scan line orientation and the orientation of the bars in the barcode.

Figure 12:
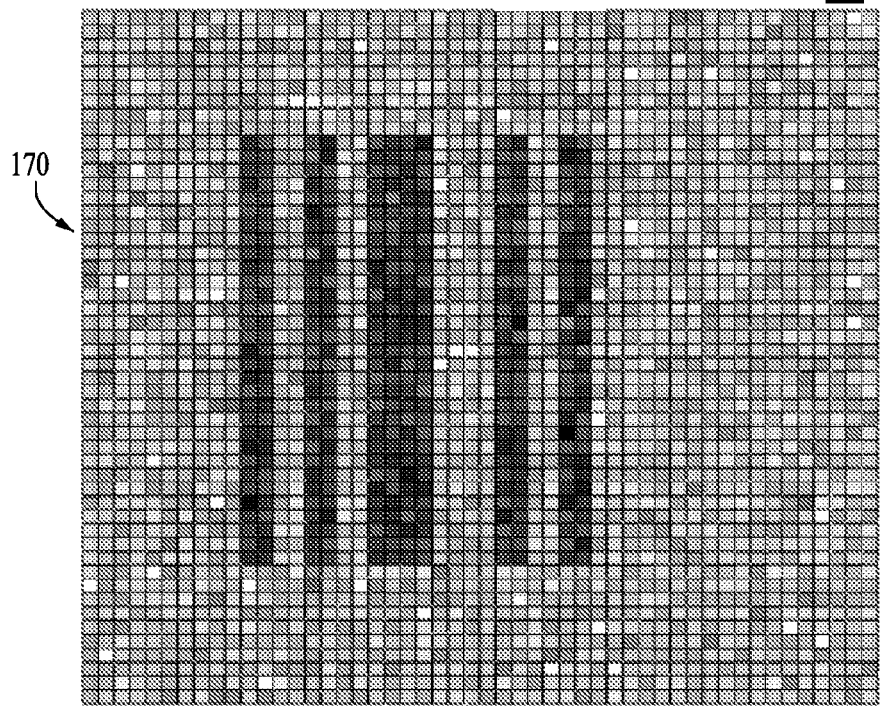
FIG. 12 illustrates an image of a simulated barcode with significant additive random noise, yielding a low SNR.
Figure 13:
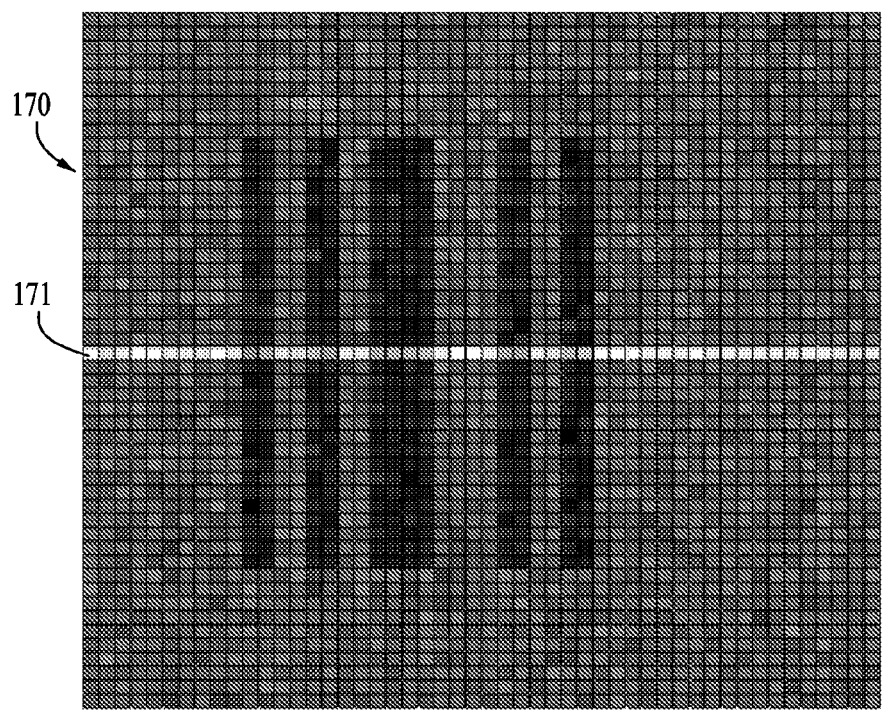
FIG. 13 illustrates a horizontal virtual scan line using one image pixel per virtual scan line pixel.
Figure 14:
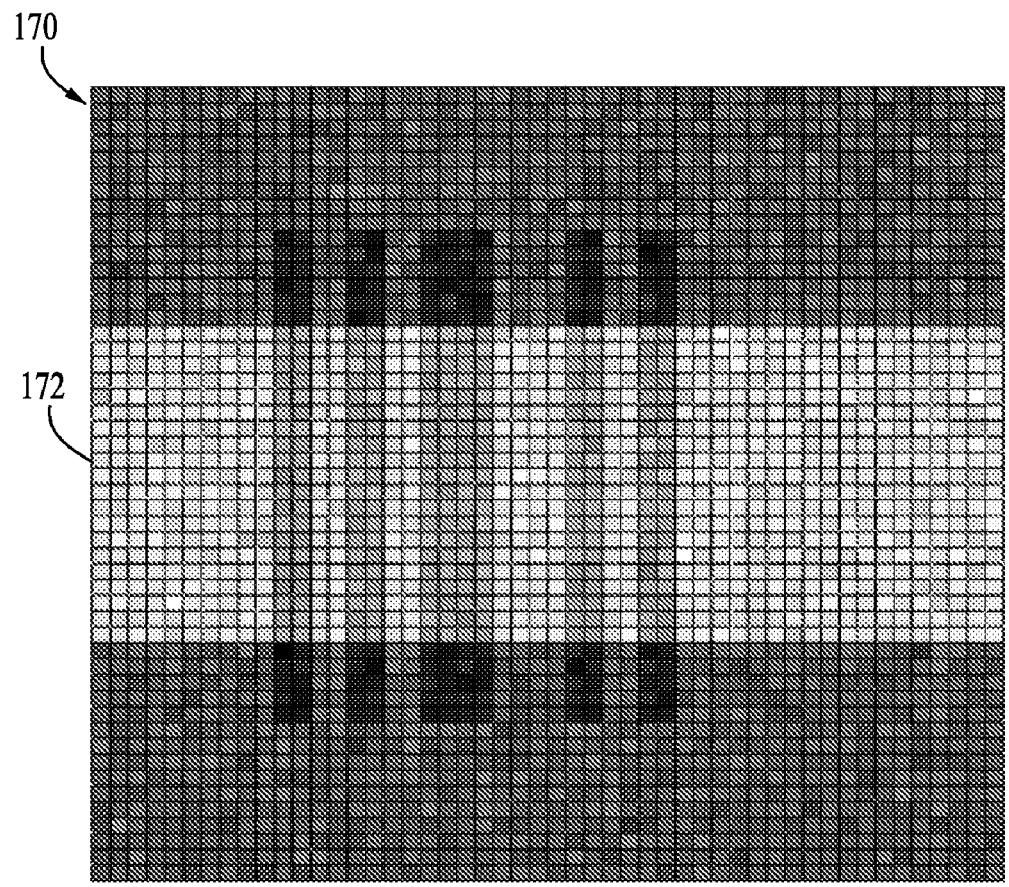
FIG. 14 illustrates a horizontal virtual scan line using 20 image pixels per virtual scan line pixel.

FIGS. 12, 13, 14 and 15 illustrate the performance of pixel summing or averaging. FIG. 12 is an image 170 of a bar pattern illustrative of a machine readable barcode. The image of a bar pattern has been corrupted by additive white noise, creating an image with a poor signal to noise ratio. FIG. 13 illustrates a virtual scan line 171 traversing the center of the bar pattern image 170 in a direction normal to the bars of the barcode, using one image pixel per virtual scan line pixel. The pixels used to form the virtual scan line 171 are shown as highlighted. FIG. 14 illustrates a virtual scan line 172 formed by the average or sum of 20 image pixels for each virtual scan line pixel, thus illustrating pixel averaging or summing.

Figure 15:
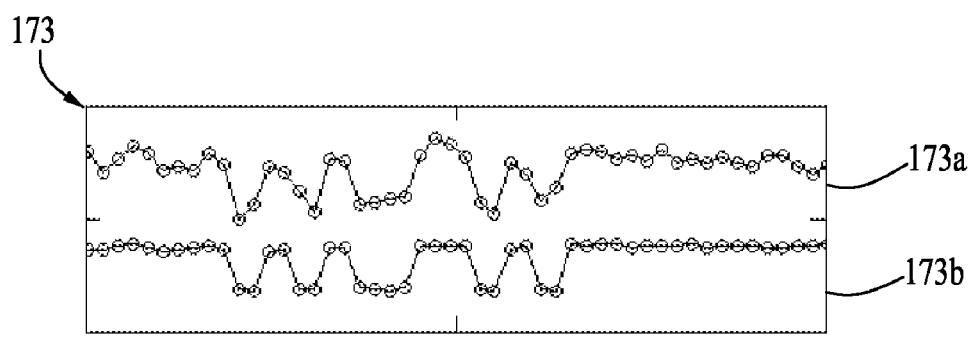
FIG. 15 illustrates a graph showing the virtual scan line data of FIGS. 13 and 14.

FIG. 15 is a graph 173 of the virtual scan line pixel data from the virtual scan lines 171 and 172 illustrated in FIGS. 13 and 14. Waveform 173a shows the pixel data from virtual scan line 171, which uses a single row of image pixels, while waveform 173b shows pixel data from virtual scan line 172, which uses the average of 20 image pixels per virtual scan line pixel. The use of averaging results in a waveform 173b with the same amplitude as the single pixel case 173a. It should be understood that the waveform resulting from pixel summing instead of averaging would be identical in form but larger in amplitude by a factor of N, the number of pixels that were summed (in this case, 20 selected to maximize the SNR). The graph shows the improvement in SNR of this technique, which is $\sqrt{N}$, or about a factor of 4.5 times better SNR in this case, when using virtual scan lines based on pixel averaging versus using a single image pixel per virtual scan line pixel.

This improvement in signal quality may enable an image to be gathered using an exposure time that is 4.5 times shorter to allow an image capture system to capture useful images of objects moving at speeds 4.5 times faster than a system not employing pixel summing. It may be appreciated that the improvement in speed is dependent on the number of pixels used in the summation, which may enable systems capable of even higher speeds than shown in this example. The limit on the factor N used for improvement of signal quality is the height of the bars of the barcode itself and the accuracy in alignment of the virtual scan line with the barcode orientation. If pixels are summed or averaged that do not include the barcode, the signal to noise ratio will be degraded, rather than improved or if the orientation difference between the virtual scan line and barcode is too large, the filtering process will blur the barcode features as each virtual scan line pixel may contain data from more than one element in the barcode. In addition, the processing burden in creating virtual scan lines using pixel summing or averaging increases as N increases, thus setting practical limits on the value of N.

If the orientation of the virtual scan line is perpendicular to the barcode (the optimal orientation) then the maximum value that N could reasonably attain is dependent on the height of the bars of the barcode and the number of pixels per bar in the image. Supposing there are K pixels per bar and the height of the barcode is Y and the width of a bar is X, then N should be less than or equal to K*Y/X, so the filter kernel would extend over the entire height of the bars. As an example, for a full height UPCA barcode of 13 mil bar size having a bar height of 1 inch, assuming a minimum resolution of 1 pixel per bar, there would be 76 pixels in the full height of a bar; thus, the value for N would need to be less than 76.

While there has been illustrated and described a disclosure with reference to certain embodiments, it will be appreciated that numerous changes and modifications are likely to occur to those skilled in the art. It is intended in the appended claims to cover all those changes and modifications that fall within the spirit and scope of this disclosure and should, therefore, be determined only by the following claims and their equivalents.

What is claimed is:

1. A method of reading an encoded symbol, comprising the steps of:
   capturing a 2-D image of the encoded symbol;
   generating virtual scan line trajectories across the encoded symbol;
   generating virtual scan signals of a subset of the 2-D image by convolving a 2-D kernel with the 2-D image of the encoded symbol along the virtual scan line trajectories;
   locating edges in the virtual scan line signals; and
   decoding the encoded symbol using the edges.

2. A method of claim 1 wherein the step of generating virtual scan signals comprises summing selected pixels in the 2-D image.

3. A method of claim 2 where the step of convolving a 2-D kernel with the 2-D image comprises summing pixels of an image at predetermined offsets in memory from pixels located along the virtual scan line trajectories.

4. A method of claim 1 further comprising the step of illuminating the encoded symbol with a light source.

5. A method of reading an encoded symbol, comprising the steps of
   capturing an image of the encoded symbol onto a 2-D imaging array;
   creating a subset of the image via a pattern of virtual scan lines of arbitrary position and angle using the image that has been captured, wherein a virtual scan line is generated by using a plurality of image pixels in the neighborhood of the virtual scan line to generate a combined pixel value for each pixel along the virtual scan line;
   processing combined pixel values along the virtual scan lines using a decoding algorithm.

6. A method of claim 5 wherein the plurality of image pixels in the neighborhood of the virtual scan line comprises a plurality of pixels offset perpendicular to the virtual scan line.

7. A method of claim 5 wherein the step of using a plurality of image pixels in the neighborhood of the virtual scan line to generate a combined pixel value for each pixel along the virtual scan line comprises
   convolving a 2-D kernel with the image of the encoded symbol along a virtual scan line trajectory.

8. A method of claim 5 further comprising the step of illuminating the encoded symbol with a light source.

* * * * *